United States Patent [19]

Yamanaka

[11] Patent Number: 4,791,153
[45] Date of Patent: Dec. 13, 1988

[54] MOLDING RESIN COMPOSITION

[75] Inventor: Sshunichiro Yamanaka, Osaka, Japan

[73] Assignee: Orient Chemical Industries, Ltd., Japan

[21] Appl. No.: 138,294

[22] Filed: Dec. 28, 1987

[30] Foreign Application Priority Data

Dec. 29, 1986 [JP] Japan .................................. 61-312922

[51] Int. Cl.$^4$ ............................................... C08K 5/35
[52] U.S. Cl. .................................... 523/453; 523/458; 524/90
[58] Field of Search ................... 524/90; 523/453, 458

[56] References Cited

FOREIGN PATENT DOCUMENTS 49-108202 2/1973 Japan ...................................... 524/90

Primary Examiner—Lewis T. Jacobs
Attorney, Agent, or Firm—McGlew and Tuttle

[57] ABSTRACT

A molding resin composition for preparing molded pieces which are suited to laser masking. The composition comprises a thermosetting resin, a curing agent, an inorganic white filler and 0.1 to 3% by weight of a coloring agent represented by the formula (I)

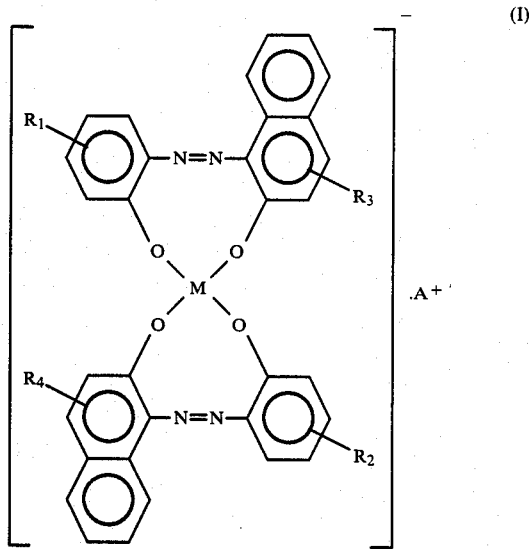

wherein $R_1$ and $R_2$ are each hydrogen, halogen, $C_1$-$C_8$ alkyl, substituted or unsubstituted sulfonamido or $SO_2CH_3$; $R_3$ and $R_4$ are each hydrogen, $C_1$-$C_8$ alkyl, or substituted or unsubstituted carbonamido; M is Cr, Fe or Co; and A is H, $NH_4$, ammonium ion of a primary, secondary or tertiary amine or quaternary ammonium ion.

10 Claims, No Drawings

MOLDING RESIN COMPOSITION

FIELD AND BACKGROUND OF THE INVENTION

1. Field of the Invention

The present invention relates to a molding composition which is suitable for enclosing mainly electronic parts, especially semiconductor devices, and which is useful for preparing molded products having a surface amenable to laser marking.

2. Description of the Prior Art

Conventionally molded resin pieces are marked with a special thermosetting ink. However, this marking method has the problem of requiring much time and making blurred or readily removable marks.

To overcome this problem, techniques have recently been developed for marking such pieces with a laser beam. For example, the resin surface is roughened with a laser beam to make a mark and create an enhanced contrast between the mark portion and the other or background portion of the surface. The laser beam is also used for destroying coloring agents contained in compositions to afford a contrast. The coloring agents used in such compositions heretofore disclosed include ultramarine (Unexamined Japanese patent application SHO 56-144995), black organic dye (Unexamined Japanese patent application SHO 60-47065) and carbon black (Unexamined Japanese patent application SHO 60-202119).

Nevertheless, the composition incorporating an organic pigment has the drawback that the pigment must be used in a large amount and impairs the insulation and reliability of electronic parts for which the composition is used. Although black organic dyes, especially chromium-containing black azo dyes, have satisfactory marking characteristics, those for use in laser marking have nitro groups on the dye skeleton, are low in thermal stability, cannot therefore be finely pulverized, encounter difficulty in affording a uniform composition, and significantly are positive when tested for mutagenicity.

SUMMARY OF THE INVENTION

A main object of the present invention is to overcome the drawbacks and deficiencies of the prior art, and to provide a molding resin composition chiefly for use in enclosing electronic parts to form molded pieces which can be marked with a laser beam distinctly with a sharp contrast, the composition being usable without impairing the insulation and reliability of such parts.

To fulfill the foregoing object, the invention provides a molding resin composition for preparing a molded product having a surface amenable to laser marking. The composition comprises a thermosetting resin, a curing agent, an inorganic white filler and a coloring agent, and is characterized in that the coloring agent is a compound represented by the formula

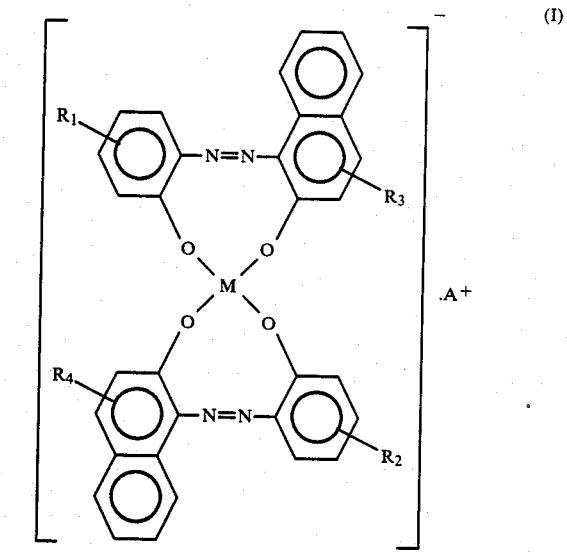

wherein $R_1$ and $R_2$ are each hydrogen, halogen, $C_1$-$C_8$ alkyl, substituted or unsubstituted sulfonamido or $SO_2CH_3$; $R_3$ and $R_4$ are each hydrogen, $C_1$-$C_8$ alkyl, or substituted or unsubstituted carbonamido; M is Cr, Fe or Co; and A is H, $NH_4$, ammonium ion of a primary, secondary or tertiary amine or quaternary ammonium ion.

The various features of novelty which characterize the invention are pointed out with particularity in the claims annexed to and forming a part of this disclosure. For a better understanding of the invention, its operating advantages and specific objects attained by its uses, reference is made to the accompanying examples and descriptive matter in which preferred embodiments of the invention are illustrated.

DETAILED DESCRIPTION OF THE INVENTION

Examples of thermosetting resins useful for the molding resin composition of the invention are epoxy resins, phenolic resins, imide resins, urea resins and the like. Examples of preferred curing agents are amines and imidazoles. Suitable fillers are inorganic white fillers, such as silica, titanium dioxide and finely divided alumina.

The coloring agent of the invention represented by formula (I) above is contained in the composition preferably in an amount of 0.1 to 3% by weight, based on the total of the other three components forming the resin composition. When containing less than 0.1% by weight of the coloring agent, it is difficult for the present composition to exhibit the contemplated effect. The presence of more than 3% by weight of the coloring agent results in a lower contrast and poor insulating properties.

The present resin composition contains the other components preferably in the following proportions: 20 to 40% by weight of the thermosetting resin, 1 to 10% by weight of the curing agent and 60 to 80% by weight of the inorganic white filler.

Given below are more specific examples of compounds of the invention represented by the formula (I).

The properties of the compound of each example were measured in the following manner:

Each compound was prepared by an ordinary method as a wet cake. The wet cake was washed two or three times with ion-exchanged water which was tenfold the weight of the dry weight of the compound. The washed compound was dried and then pulverized by an ordinary method. Thereafter, the total inorganic ion concentration, Na ion concentration and Cl ion concentration of the particles were measured by ion-chromatography and the mean particle size of the particles was measured by a precision size distribution analyzer.

| No. | Compound | Properties | |
|---|---|---|---|
| (1) | 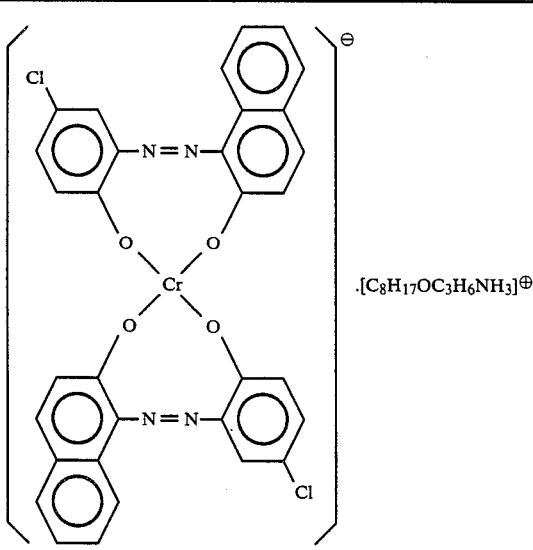 | Color: | Reddish purple |
| | | Total inorganic ion concentration: | 700 ppm |
| | | Na ion: | 10 ppm |
| | | Cl ion: | 160 ppm |
| | | Mean particle size: | 2 μm |
| (2) | 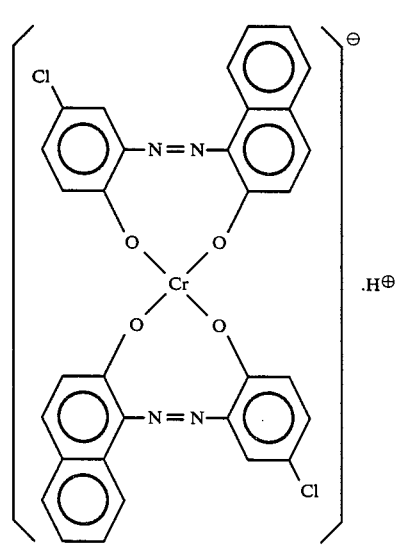 | Color: | Reddish purple |
| | | Total inorganic ion concentration: | 500 ppm |
| | | Na ion: | 6 ppm |
| | | Cl ion: | 100 ppm |
| | | Mean particle size: | 4 μm |

| No. | Compound | Properties | |
|---|---|---|---|
| (3) | 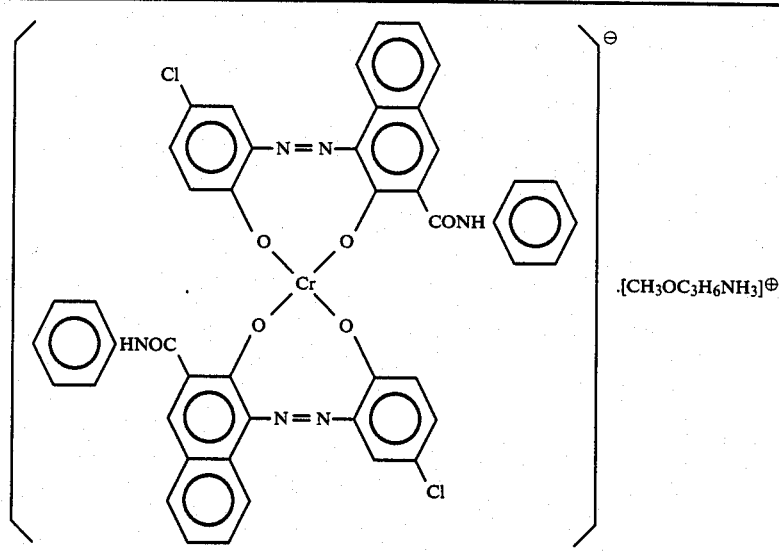 .[CH₃OC₃H₆NH₃]⁺ | Color: | Reddish purple |
| | | Total inorganic ion concentration: | 500 ppm |
| | | Na ion: | 15 ppm |
| | | Cl ion: | 120 ppm |
| | | Mean particle size: | 2 μm |
| (4) | 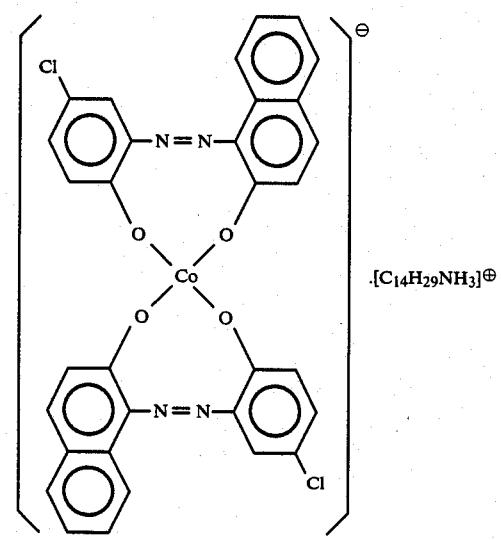 .[C₁₄H₂₉NH₃]⁺ | Color: | Purple |
| | | Total inorganic ion concentration: | 300 ppm |
| | | Na ion: | 8 ppm |
| | | Cl ion: | 160 ppm |
| | | Mean particle size: | 4 μm |
| (5) | 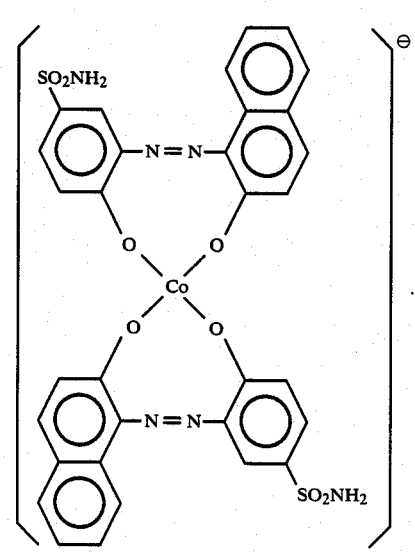 .[C₈H₁₇OC₃H₆NH₃]⁺ | Color: | Bordeaux |
| | | Total inorganic ion concentration: | 600 ppm |
| | | Na ion: | 4 ppm |
| | | Cl ion: | 150 ppm |
| | | Mean particle size: | 4 μm |

-continued
| No. | Compound | Properties | |
|---|---|---|---|
| (6) | 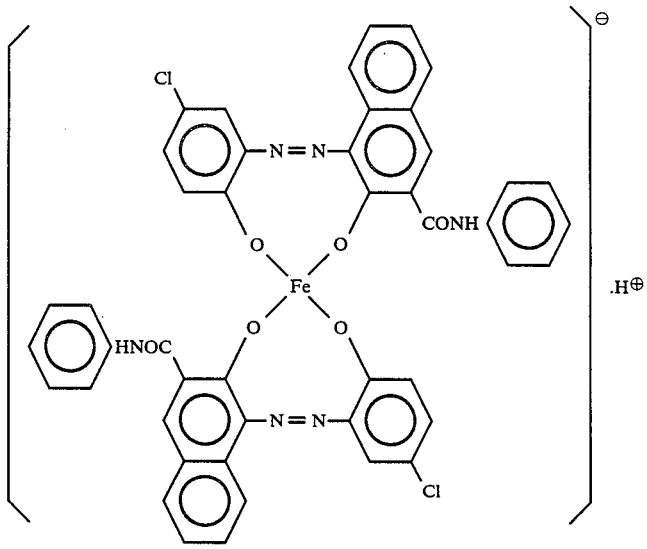 | Color:<br>Total inorganic ion concentration:<br>Na ion:<br>Cl ion:<br>Mean particle size: | Brown<br>600 ppm<br>8 ppm<br>200 ppm<br>3 μm |
| (7) | 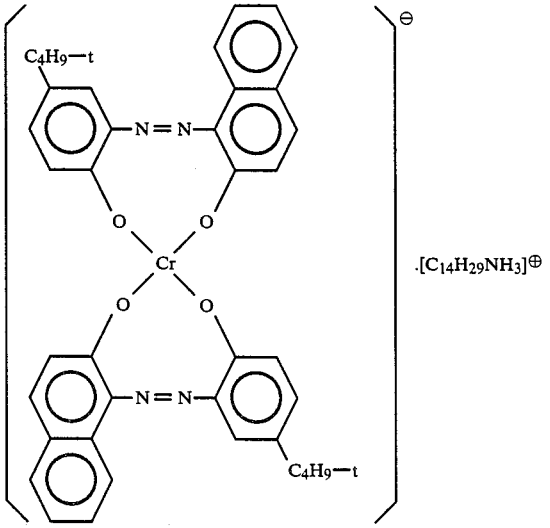 | Color:<br>Total inorganic ion concentration:<br>Na ion:<br>Cl ion:<br>Mean particle size: | Red<br>540 ppm<br>4 ppm<br>220 ppm<br>4 μm |

-continued

| No. | Compound | Properties | |
|---|---|---|---|
| (8) | 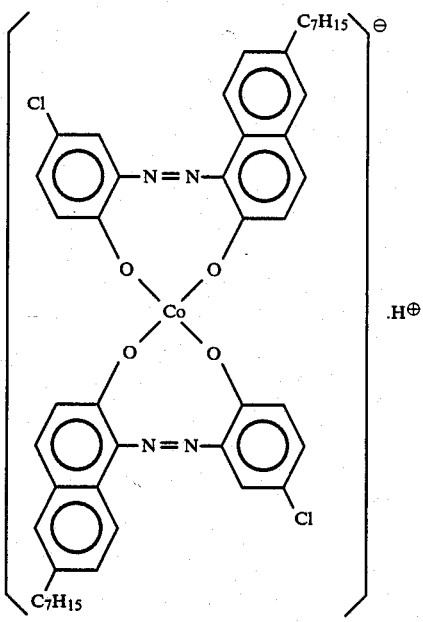 | Color:<br>Total inorganic ion concentration:<br>Na ion:<br>Cl ion:<br>Mean particle size: | Purple<br>600 ppm<br><br>4 ppm<br>180 ppm<br>3 μm |
| (9) | 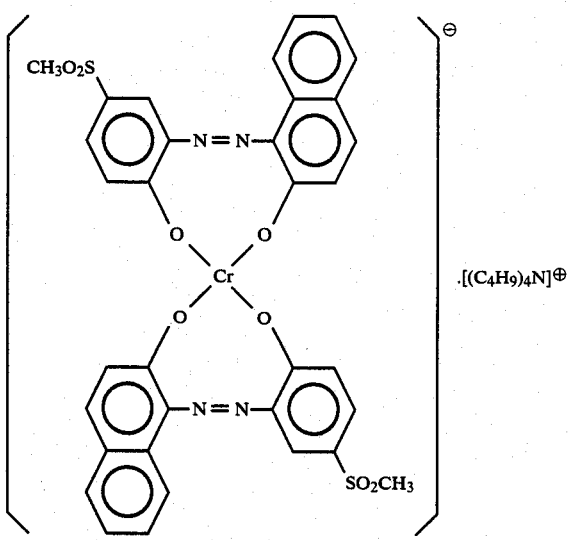 | Color:<br>Total inorganic ion concentration:<br>Na ion:<br>Cl ion:<br>Mean particle size: | Brownish purple<br>420 ppm<br><br>5 ppm<br>160 ppm<br>2 μm |

The present invention will be described with reference to the following examples, in which the parts are all by weight, unless otherwise specifically indicated.

EXAMPLE 1

A molding resin composition was prepared from the following ingredients.

| | |
|---|---|
| Cresol novolak resin<br>(Araldite ECN-1280, product of Ciba Geigy) | 20 parts |
| Novolak-type phenolic resin<br>(Varcum TD-1231, product of Dainippon Ink & Chemicals Inc.) | 10 parts |
| High-purity silica glass powder<br>(Fuselex CRS-1001, product of Tatsumori Co., Ltd.) | 68 parts |
| 2-Methylimidazole (curing promoting agent) | 2 parts |

-continued

| | |
|---|---|
| Coloring agent (1) | 0.3 part |

The ingredients were premixed together, kneaded with mixing rolls heated at 80° to 100° C. and made into a sheet, which was then cooled and pulverized to obtain a resin composition powder. Using a transfer press, the powder was molded into a piece, 10 mm in width, 30 mm in length and 3 mm in thickness, which was used as a specimen.

The specimen was marked by a carbon dioxide laser marker (Unimark Model 400, product of Ushio Denki Kogyo Co., Ltd., maximum energy 10 joules/cm$^2$), with a pulse duration of 1 microsecond, using the desired mask.

EXAMPLES 2-8

Specimens were prepared in the same manner as in Example 1 with the exception of using the coloring agents listed in Table 1 in place of the coloring agent used in Example 1.

COMPARATIVE EXAMPLES 1-4

Specimens were prepared in the same manner as in Example 1 with the exception of using the coloring agents for the comparative examples (Cmp. Ex.) listed in Table 1.

TABLE 1

| | \multicolumn{9}{c}{Coloring agent} | | | | | | | | |
|---|---|---|---|---|---|---|---|---|---|
| | (1) | (2) | (3) | (4) | (5) | (6) | Black dye A | Black dye B | Carbon black |
| Example 1 | 0.3 | 0 | 0 | 0 | 0 | 0 | 0 | 0 | 0 |
| Example 2 | 0 | 0.3 | 0 | 0 | 0 | 0 | 0 | 0 | 0.2 |
| Example 3 | 0 | 0 | 0.3 | 0 | 0 | 0 | 0 | 0 | 0 |
| Example 4 | 0 | 0 | 0.3 | 0 | 0 | 0 | 0 | 0 | 0.2 |
| Example 5 | 0 | 0 | 0 | 0.3 | 0 | 0 | 0 | 0 | 0 |
| Example 6 | 0 | 0 | 0 | 0.3 | 0 | 0 | 0 | 0 | 0.2 |
| Example 7 | 0 | 0 | 0 | 0 | 0.3 | 0 | 0 | 0 | 0 |
| Example 8 | 0 | 0 | 0 | 0 | 0 | 0.3 | 0 | 0 | 0 |
| Cmp. Ex. 1 | 0 | 0 | 0 | 0 | 0 | 0 | 0 | 0 | 5 |
| Cmp. Ex. 2 | 0 | 0 | 0 | 0 | 0 | 0 | 0.3 | 0 | 0 |
| Cmp. Ex. 3 | 0 | 0 | 0 | 0 | 0 | 0 | 0.3 | 0 | 0.2 |
| Cmp. Ex. 4 | 0 | 0 | 0 | 0 | 0 | 0 | 0 | 0.3 | 0.2 |

Notes:
Black dye A: ORASOL Black CN (product of Ciba Geigy, C.I. Solvent Black 28)
Black dye B: Valifast Black #3820 (product of Orient Kagaku Kogyo K.K., C.I. Solvent Black 27)
The values listed are amounts in parts by weight.

Table 2 shows the electrical characteristics and inorganic ion concentration of the molding resin compositions of Examples 1 to 8 and Comparative Examples 1 to 4 (Comp. Ex.), and the contrast of the markings on the specimens of these examples, according to the four categories: very distinct, distinct, obscure (none found) and illegible.

TABLE 2

| | Volume resistivity ($\Omega \cdot$ cm) | Inorganic ion concentration | Contrast of marking |
|---|---|---|---|
| Example 1 | $5.8 \times 10^{16}$ | Up to 10 ppm | Very distinct |
| Example 2 | $4.3 \times 10^{16}$ | " | " |
| Example 3 | $6.1 \times 10^{16}$ | " | " |
| Example 4 | $4.7 \times 10^{16}$ | " | " |
| Example 5 | $5.7 \times 10^{16}$ | " | " |
| Example 6 | $5.0 \times 10^{16}$ | " | " |
| Example 7 | $4.9 \times 10^{16}$ | " | " |
| Example 8 | $4.4 \times 10^{16}$ | " | " |
| Comp. Ex. 1 | $5.0 \times 10^{14}$ | Up to 10 ppm | Illegible |
| Comp. Ex. 2 | $1.4 \times 10^{16}$ | Up to 20 ppm | Distinct |
| Comp. Ex. 3 | $8.0 \times 10^{15}$ | " | " |
| Comp. Ex. 4 | $1.0 \times 10^{16}$ | " | " |

Advantages of the Invention

According to the present invention wherein the compound of the formula (I) is used, water-soluble free inorganic salts are fully removable by washing, assuring the resulting molded product of good insulating properties, while the compound, which has high heat resistance (about 300° C.), permits the composition to be pulverized finely (maximum particle size, up to 10 μm; volume average particle size, 4 μm) and is dispersible in the resin component satisfactorily with good compatibility. The compound does not deteriorate during the thermal curing of the composition, which is therefore usable for electronic parts without the likelihood of impairing the reliability thereof. Although it is difficult to obtain black color when the compounds of the formula (I) are used singly, these compounds provide various distinct colors. Significantly, they are found negative when tested for mutagenicity and are usable with high safety.

Accordingly, the electronic parts or the like enclosed with the present resin composition in the conventional manner, can be furnished with marks which are of high contrast (contrasty), distinct and highly legible, while the molded pieces have excellent electrically insulating properties and ensure high reliability.

In regard to the compounds of formula (I) above, according to certain features of the invention, $R_1$ and $R_2$ may be chlorine atoms, and $R_3$ and $R_4$ may be hydrogen, $C_1$-$C_8$ alkyl or N-phenyl carbonamido; or $R_1$ and $R_2$ may be $C_1$-$C_8$ alkyl, sulfonamido or $SO_2CH_3$, and $R_3$ and $R_4$ may be hydrogen. In particular, $R_1$ and $R_2$ may both be chlorine atoms, $C_1$-$C_8$ alkyl, sulfonamido or $SO_2CH_3$, and $R_3$ and $R_4$ may both be hydrogen, $C_1$-$C_8$ alkyl, or N-phenyl carbonamido.

Similarly, A may be hydrogen, an ammonium ion of a primary amine or a quaternary ammonium ion. In particular, A may be hydrogen, an ammonium ion of an alkyl amine, an ammonium ion of an alkoxyalkyl amine, or a tetraalkyl quaternary ammonium ion. More especially, A may be an ammonium ion of an alkyl amine, an ammonium ion of an alkoxyalkyl amine, or a tetraalkyl quaternary ammonium ion.

It will be appreciated that the compounds of formula (I) above are all known compounds which may be prepared in known manner. However, they have not been heretofore suggested as usable for the purposes contemplated by the present invention.

Thus, to produce the corresponding coloring agent compound of formula (I), a monoazo dye prepared by the usual diazotization coupling reaction is dissolved in organic solvent, and reacted with the corresponding Cr compound, Co compound or Fe compound. The reaction mixture is dispersed in water, and then filtered off to obtain a wet cake of 2:1 metal complex represented by formula (I), i.e. wherein A is hydrogen.

The obtained wet cake is dispersed in water or dissolved in organic solvent, and reacted with the corresponding amine. The reaction mixture is dispersed in water, and then filtered off to obtain a wet cake of 2:1 metal complex represented by formula (I), i.e. wherein A is amine.

All of the coloring compounds (1) through (9) above are made in accordance with the above stated procedures, as the case may be, depending on the constitution of the A moiety.

While specific embodiments of the invention have been shown and described in detail to illustrate the application of the principles of the invention, it will be understood that the invention may be embodied otherwise without departing from such principles.

What is claimed is:

1. Molding resin composition for preparing a molded product having a surface amenable to laser marking, the composition comprising a thermosetting resin, a curing agent, an inorganic white filler and a coloring agent, in which the coloring agent is a compound represented by the formula

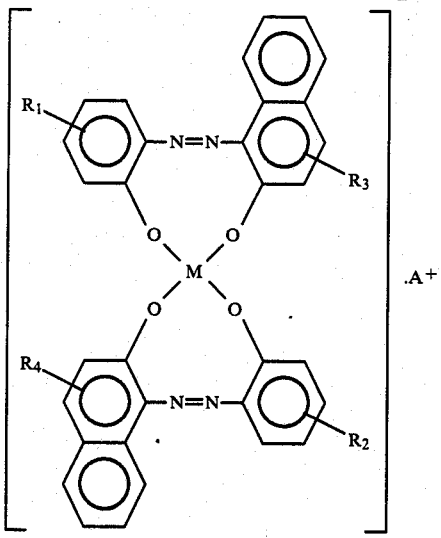

(I)

wherein $R_1$ and $R_2$ are each hydrogen, halogen, $C_1$-$C_8$ alkyl, substituted or unsubstituted sulfonamido or $SO_2CH_3$; $R_3$ and $R_4$ are each hydrogen, $C_1$-$C_8$ alkyl, or substituted or unsubstituted carbonamido; M is Cr, Fe or Co; and A is H, $NH_4$, ammonium ion of a primary, secondary or tertiary amine or quaternary ammonium ion.

2. Composition of claim 1 wherein the compound of formula (I) is contained in an amount of 0.1 to 3% by weight.

3. Composition of claim 1 which comprises 20 to 40% by weight of the thermosetting resin, 1 to 10% by weight of the curing agent and 60 to 80% by weight of the inorganic white filler.

4. Composition of claim 1 wherein $R_1$ and $R_2$ are chlorine atoms, and $R_3$ and $R_4$ are hydrogen, $C_1$-$C_8$ alkyl or N-phenyl carbonamido.

5. Composition of claim 1 wherein $R_1$ and $R_2$ are $C_1$-$C_8$ alkyl, sulfonamido or $SO_2CH_3$, and $R_3$ and $R_4$ are hydrogen.

6. Composition of claim 1 wherein $R_1$ and $R_2$ are both chlorine atoms, $C_1$-$C_8$ alkyl, sulfonamido or $SO_2CH_3$, and $R_3$ and $R_4$ are both hydrogen, $C_1$-$C_8$ alkyl, or N-phenyl carbonamido.

7. Composition of claim 1 wherein A is hydrogen, an ammonium ion or a primary amine or a quaternary ammonium ion.

8. Composition of claim 1 wherein A is hydrogen, an ammonium ion of an alkyl amine, an ammonium ion of an alkoxyalkyl amine, or a tetraalkyl quaternary ammonium ion.

9. Composition of claim 1 wherein A is an ammonium ion of an alkyl amine, an ammonium ion of an alkoxyalkyl amine, or a tetraalkyl quaternary ammonium ion.

10. Composition of claim 1 wherein $R_1$ and $R_2$ are both chlorine atoms, $C_1$-$C_8$ alkyl, sulfonamido or $SO_2CH_3$, $R_3$ and $R_4$ are both hydrogen, $C_1$-$C_8$ alkyl, or N-phenyl carbonamido, and A is hydrogen, an ammonium ion of an alkyl amine, an ammonium ion of an alkoxyalkyl amine, or a tetraalkyl quaternary ammonium ion.

* * * * *